Dec. 10, 1935.    W. W. WILLIAMSON    2,023,800
SHOCK RESISTING CONCRETE
Filed Dec. 22, 1933
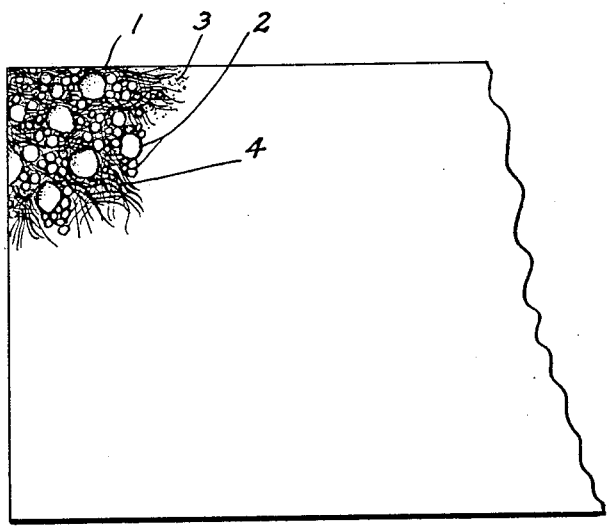
INVENTOR.
Wilbur Worth Williamson
BY Miller Boyken & Bried
ATTORNEYS.

COATING OR PLASTIC.

Patented Dec. 10, 1935

2,023,800

UNITED STATES PATENT OFFICE 2,023,800

SHOCK-RESISTING CONCRETE

Wilbur Worth Williamson, Oakland, Calif., assignor to The Pacific Lumber Company, San Francisco, Calif., a corporation of Maine Application December 22, 1933, Serial No. 703,633

2 Claims. (Cl. 106—24)

This invention relates to cement construction, particularly walls and roofs of buildings, and it has for its principal object a shock-resisting resilient bodied cement or concrete slab, block, or wall construction, which will not shatter or crack under concentrated violent impact as of missiles, falling rocks from great heights above, projectiles shot with destructive intent, etc. Other advantages of the compound cement body include structural use, sound and thermal insulation, and light-weight tough fireproof partition construction.

The accompanying drawing shows in greatly enlarged elevation the characteristic appearance of an average sample of my improved cement or concrete product though it is impossible to perfectly show the mass of tangled fibers therein.

The basis of the invention is an aerated or gas-filled cementitious mixture of the general nature of the air or gas mixed porous cement mass known in the art as Bubblestone or cellular concrete, which is filled with a myriad of small air or gas bubbles, and to which mass is incorporated by stirring, a quantity of finely shredded resilient fibrous matter such as redwood bark shredded to a condition about as fine as hair or wool, and then permitting the mass to set.

Such cellular cement or concrete masses are made by various processes, such as by forcing or beating air or gas bubbles into a liquid mixture of Portland cement and water or with sand or other fine aggregate, though preferably by the additional incorporation of a bubble sustaining or frothing compound composed of a glutinous material such as casein and water together with calcium hydrate, all as set forth in the Bubblestone Company's Patents Nos. 1,717,319 of June 11, 1929, and 1,769,275 of July 1, 1930, to which reference is made as this merely forms one of the desirable cellular cement or concrete bases preferably used by applicant, though other cements such as magnesite cement likewise beaten up with air or blown full of gas or air bells will also serve as a base for my improvements though it will not so effectually resist outside exposure to the elements.

The liquid bubble impregnated cement mass may be of various densities, richness of cement, and admixture of inert matter such as sand, diatomaceous earth, etc., depending on the use and strength demanded of the final product, so that its weight per cubic foot may run from about 20 to 80 pounds per cubic foot, and to a cubic foot of which mixture the finely shredded redwood bark may be added in quantity running from about ¼ to 10 pounds, the more serviceable range being from about ½ to 5 pounds. This fiber is unground, as long resilient fibers are required, and it may be introduced either before, during or after filling the mass with the gaseous bubbles, though it is more practical to remove the cement mass from the gas or air-charging apparatus of whatever kind used, and incorporate the fine fiber in any simple mixer of the type having revolving arms as used for mixing dough, asphalt, plaster, or other viscous materials.

The fiber may be introduced moist or dry, though the latter form is preferable as it carries a great many more air bells into the mass. Mixing should be made in as short a time as will still show the fiber to be well covered with cement, but no longer as prolonged mixing seems to tend toward escape of bubbles from the mass. When sufficiently mixed, which should be in a minute or two, the mass may be poured or pushed into forms for walls, slabs, blocks, or any other shape, or troweled in place or spread in one or several heavy layers as from a half inch to ten inches or more, depending on the shock-absorbing or blow-resisting qualities desired.

The incorporation of the extremely fine, shredded wool-like redwood bark fiber functions to hold the myriads of bubbles in place during the setting of the mass, and makes it possible to use much less, or altogether avoid the use of the frothing mixture in some cases, and when the block or slab is set it has greatly increased tensile strength over other light weight concretes and if subjected to a violent blow as of a hammer will crush locally only until the contained fibers form a matted resilient mass to stop further progress of the hammer, but it will not fracture. In fact its power to absorb sudden blows makes it ideal as a protective shield over the roofs of power houses adjacent rocky mountains or banks from which large rocks may become loosened and precipitated, also as a protection to arsenals and other buildings against deliberate attack.

Besides finely shredded redwood bark I have tried other finely shredded barks, also various finely shredded woods, cane fiber, etc., and while they all have value in carrying out the invention, the shredded redwood bark of a fineness about equal to hair or wool is preferred as it is resilient even after having been embedded in the cement for a long time, and is quite proof against deterioration through the action of air or moisture creeping into the hardened cellular product. Another valuable feature is that a surface badly injured as by a tremendous blow, may be easily repaired by blowing out the loose particles, wetting and patching in with new material to interlock with the adjacent fibers with substantially original strength when set. Still another advantage of the material over the ordinary cellular concretes and Bubblestone is the fact that it will not run out of small cracks and holes so hard to avoid in form work, but speedily plugs up any which may exist in the forms.

My product is not to be confused with mere fibered plaster, for it contains a very large proportion of fiber adapted to form a shock-absorbing mat when the concrete is subjected to impact, and the fiber is of such a nature to cooperate with the bubbles artificially formed or introduced into the mass as to stabilize them during setting as well as to cooperate with them in gradually absorbing any blow applied.

In the drawing 1 represents the side of a cement or concrete block or hardened mass made in accordance with my invention and in which 2 are the bubbles of various sizes, 3 the sand or other inert matter (when used) and 4 the finely shredded redwood bark.

In my appended claims my use of the words "cellular concrete" or "cement mixture" is intended to include any of the light weight cellular cement mixtures however produced.

Having thus described my invention and some of its properties and uses, what I claim is:—

1. A shock-resisting concrete having a cellular body and throughout the body an intertwined mass of long shredded redwood bark fibers in quantity running from about one-half to five pounds of fiber per cubic foot of concrete whereby a substantially unbreakable mat is formed at a point of severe impact.

2. A shock-resisting concrete having a highly cellular body filled with artificially produced gas cells and a quantity of long finely shredded redwood bark fiber in amount from one-half to five pounds per cubic foot of concrete, intertwined throughout its mass to form a resilient substantially unbreakable mat-like mass upon severe impact.

WILBUR WORTH WILLIAMSON.